United States Patent
Zheng et al.

(10) Patent No.: US 12,101,254 B2
(45) Date of Patent: Sep. 24, 2024

(54) PACKET PROCESSING METHOD AND NETWORK DEVICE

(71) Applicant: HUAWEI TECHNOLOGIES CO., LTD., Shenzhen (CN)

(72) Inventors: Hewen Zheng, Nanjing (CN); Lei Han, Nanjing (CN); Haidong Feng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 843 days.

(21) Appl. No.: 17/155,276

(22) Filed: Jan. 22, 2021

(65) Prior Publication Data
US 2021/0144092 A1 May 13, 2021

Related U.S. Application Data

(63) Continuation of application No. 16/399,717, filed on Apr. 30, 2019, now Pat. No. 10,931,580, which is a
(Continued)

(30) Foreign Application Priority Data

Nov. 2, 2016 (CN) .......................... 201610945556.7

(51) Int. Cl.
*H04L 45/745* (2022.01)
*H04L 9/40* (2022.01)
(Continued)

(52) U.S. Cl.
CPC .............. *H04L 45/745* (2013.01); *H04L 9/40* (2022.05); *H04L 45/38* (2013.01); *H04L 45/741* (2013.01);
(Continued)

(58) Field of Classification Search
CPC ......... H04L 45/745; H04L 9/40; H04L 45/38; H04L 45/741; H04L 47/20; H04L 47/31; H04L 63/101; H04L 63/164; H04L 69/161
See application file for complete search history.

(56) References Cited

U.S. PATENT DOCUMENTS 9,716,592 B1 * 7/2017 Mandal ................. H04L 45/245
2013/0064247 A1 3/2013 Song et al.
(Continued)

FOREIGN PATENT DOCUMENTS

CN 102035724 A 4/2011
CN 103534991 A 1/2014
(Continued)

OTHER PUBLICATIONS

RFC2460,S. Deering et al., "Internet Protocol, Version 6 (IPv6) Specification" Network Working Group, dated Dec. 1998.total 39 pages.
(Continued)

*Primary Examiner* — Ronald B Abelson
(74) *Attorney, Agent, or Firm* — Maier & Maier, PLLC

(57) ABSTRACT

Embodiments of the present disclosure provide a packet processing method and a network device, so as to effectively resolve a problem that a quantity of concurrent packet processing policies is limited in a network device due to scarce hardware resources of a packet forwarding chip. A method part in the embodiments of the present disclosure includes: obtaining, by a first network device, identification information; processing, by the first network device, a packet when receiving the packet, where a processed packet includes the identification information, and packets corresponding to different preset policy information include different identification information; and sending, by the first network device, the processed packet to a second network
(Continued)

device, so that the second network device matches a corresponding policy for the processed packet based on the identification information.

20 Claims, 15 Drawing Sheets

Related U.S. Application Data continuation of application No. PCT/CN2017/109038, filed on Nov. 2, 2017.

(51) Int. Cl.
*H04L 45/00* (2022.01)
*H04L 45/741* (2022.01)
*H04L 47/20* (2022.01)
*H04L 47/31* (2022.01)
*H04L 69/16* (2022.01)
*H04L 45/50* (2022.01)

(52) U.S. Cl.
CPC ............. *H04L 47/20* (2013.01); *H04L 47/31* (2013.01); *H04L 63/101* (2013.01); *H04L 63/164* (2013.01); *H04L 69/161* (2013.01); *H04L 45/50* (2013.01)

(56) References Cited

U.S. PATENT DOCUMENTS

| 2014/0016501 A1 | 1/2014 | Kamath et al. |
| 2016/0142312 A1 | 5/2016 | Liu et al. |

FOREIGN PATENT DOCUMENTS

| CN | 104702505 A | 6/2015 |
| CN | 106034089 A | 10/2016 |

OTHER PUBLICATIONS

RFC791 Marina del Rey, Internet Protocol DARPA Internet Program Protocol Specification, dated Sep. 1981, total 51 pages.
RFC7348 M. Mahalingam et al., "Virtual eXtensible Local Area Network (VXLAN): A Framework for Overlaying Virtualized Layer 2 Networks over Layer 3 Networks", Independent Submission, dated Aug. 2014, total 22 pages.
RCE790, J. Postel et al. Assigned Numbers, Network Working Group, Sep. 1981, total 15 pages.
RFC6564, S. Krishnan et al. A Uniform Format for IPV6 Extension Headers, Network Working Group, Apr. 2012, total 6 pages.
Seyed Kaveh Fayazbakhsh: "FlowTags: Enforcing Network-Wide Policies in the Presence of Dynamic Middlebox Actions", HotSDN'13, Aug. 16, 2019, total 6 pages. XP58030701.

* cited by examiner ip access-list extended apply_racl
    permit flow id 31000 interface GigabitEthernet3/1
    ip address 192.168.1.1 255.255.255.0
    ip access-group apply_racl out

PACKET PROCESSING METHOD AND NETWORK DEVICE

CROSS-REFERENCE TO RELATED APPLICATIONS

This application is a continuation of U.S. patent application Ser. No. 16/399,717, filed on Apr. 30, 2019, which is a continuation of International Application No. PCT/CN2017/109038, filed on Nov. 2, 2017. The International Application claims priority to Chinese Patent Application No. 201610945556.7, filed on Nov. 2, 2016. All of the aforementioned patent applications are hereby incorporated by reference in their entireties.

TECHNICAL FIELD

The present application relates to the field of network communications, and in particular, to a packet processing method and a network device.

BACKGROUND

An access control list (ACL) is an instruction list applied to a port of a network device such as a router or a switch, and a policy configured in these instruction lists is used to tell the network device which data packet can be received and which data packet needs to be rejected. Whether a data packet is received or rejected may be determined by a specific indication condition such as a source address, a destination address, and a port number. A main task of the access control list is to ensure that a network resource is not used and accessed illegally. The access control list is one of most important core policies for ensuring network security. A policy function configured in the access control list is essentially implemented depending on a packet forwarding chip of the network device. The network device may be a network device such as the router or the switch, and the packet forwarding chip in the network device receives or rejects a packet based on the policy configured in the access control list.

Packets of different protocols have different formats, for example, an Internet Protocol version 4 (IPv4) packet, an Internet Protocol version 6 (IPv6) packet, a data link layer (L2) packet, a Multiprotocol Label Switching (MPLS) packet, and a Transparent Interconnection of Lots of Links (TRILL) packet. Fields constituting the foregoing packets are not entirely the same. In addition, even for a same field location, meanings indicated by bits of two packets are different, and a meaning of each field follows a respective protocol specification.

Therefore, in the prior art, as shown in FIG. 1, to adapt to the packets of different protocols, before applying the policy of the access control list, the packet forwarding chip in the network device needs to first identify a packet type, and access different key construction blocks (KCB) of the packet forwarding chip based on the packet type. A schematic structural diagram of a KCB is shown in FIG. 2. For example, if a packet is an IPv4 packet, an IPv4 key construction block is accessed. Each KCB has 64 field copy engines and 7 key buffer units with a length of 160 bits. Specifically, the packet forwarding chip in the network device uses the KCB to extract a packet field, then obtains key description information through combination, to identify the packet, and stores the combined key description information into the key buffer. The key description information is then matched with a pre-configured policy. To be specific, if the key description information is matched with the pre-configured policy, the corresponding policy that has been configured for the packet is executed. As shown in FIG. 2, it may be learned that a copy engine and the key buffer are scarce resources. When the network device corresponding to a network aggregation node, a core node or the like extracts excessive matching fields, the policy cannot be delivered to hardware due to resource insufficiency. To be specific, because the copy engine and the key buffer are the scarce resources, for a packet of a same type, there is a very small quantity of resources used to construct the key description information. Consequently, it is possible that some policies configured by a user cannot be effectively executed at the same time. In other words, a quantity of concurrent packet processing policies by the network device is limited.

SUMMARY

Embodiments of the present disclosure provide a packet processing method and a network device, so as to effectively resolve a problem that a quantity of concurrent packet processing policies is limited in a network device due to scarce hardware resources of a packet forwarding chip.

In view of this, a first aspect of the embodiments of the present disclosure provides a packet processing method. In the method, a first network device obtains identification information. The first network device processes a packet when receiving the packet, and a processed packet includes the identification information. In the processed packet, the identification information that is included in packets corresponding to different preset policy information, namely, the packets corresponding to different ACL policy information, is different. The first network device sends the processed packet to a second network device based on a preset forwarding table, so that the second network device matches a corresponding policy for the processed packet based on the identification information. The second network device and the first network device are different network devices, the second network device is a downstream device of the first network device, and the preset forwarding table is a forwarding table pre-configured in the first network device. It should be understood that when forwarding the packet, the first network device forwards the packet based on information such as a route or a port indicated by the preset forwarding table.

It can be learned from the foregoing solution that, after being processed by the first network device, packets having different preset policy information have different identification information. Therefore, when performing policy matching, the second network device, namely, the downstream device of the first network device only needs to extract matching identification information and does not need to construct key description information by using a plurality of fields of the packet, to match a policy, so as to effectively resolve a problem that a quantity of concurrent packet processing policies is limited in a network device due to scarce hardware resources of a packet forwarding chip.

In a possible implementation, that a first network device obtains identification information is specifically: sending a request message to a controller, where the request message is used to request the corresponding identification information; receiving, by the first network device, the identification information sent by the controller, where the identification information is determined by the controller based on packet description information in the preset policy information. It should be understood that the preset policy information includes the packet description information and action information. The packet description information is feature information used to classify the packet as a particular packet flow, and the feature information includes but is not limited to information such as a source Medium Access Control (MAC) address, a destination MAC address, a source IP address, a destination IP address, an IP protocol type, a transport layer source port, and a transport layer destination port of the packet, and is specifically determined by the preset policy information. The identification information corresponds to the packet description information in the preset policy information, and the controller determines different identification information based on different packet description information in different preset policy information. To be specific, different packet description information corresponds to different identification information.

It can be learned from the foregoing solution that, the first network device actively requests the identification information from the controller, the identification information is directly from the controller, and the controller uniformly allocates the identification information to the packet corresponding to the packet description information in different preset policy information, so as to enhance feasibility of the solution.

In a possible implementation, that a first network device obtains identification information is specifically: receiving the identification information sent by the controller, where the identification information is determined by the controller based on the packet description information in the preset policy information. Likewise, the identification information corresponds to the packet description information in the preset policy information, and the controller determines different identification information based on different packet description information in different preset policy information. To be specific, different packet description information corresponds to different identification information.

It can be learned from the foregoing solution that, compared with the previous implementation, in this implementation, the first network device does not actively request the identification information from the controller, but the controller actively sends the identification information to the first network device. The identification information is also directly from the controller, and the controller uniformly allocates the identification information to the packet corresponding to the packet description information in different preset policy information, so as to enhance feasibility and diversity of the solution.

In a possible implementation, that a first network device obtains identification information is specifically: receiving an identification information set sent by the controller, and determining the identification information based on the identification information set, where the identification information is identification information in the identification information set. To be specific, another identification information allocation manner is provided in this embodiment of the present disclosure. To be specific, the identification information is indirectly from the controller, and the controller allocates the identification information set to the first network device. The first network device is a network device in a management domain network, the identification information in these identification information sets does not overlap each other, and the first network device autonomously determines the identification information for a flow in the identification information set authorized by the first network device and allocates identification information for packets having different preset policy configuration information.

In a possible implementation, before the first network device processes the packet, the first network device determines whether the packet carries the identification information. If the first network device determines that the packet does not carry the identification information, the first network device processes the packet based on the identification information.

To be specific, in this embodiment of the present disclosure, when processing the packet, the first network device first determines whether the packet already includes the identification information. If the packet already includes the identification information, the first network device may directly perform policy matching based on the identification information. If the packet does not include the identification information, the first network device processes the packet based on the obtained identification information, so that the processed packet includes the identification information. It can be learned that in this way, the packets having different preset policy information finally include different identification information in one network management domain.

In a possible implementation, that the first network device processes the packet based on the identification information is specifically inserting the identification information into a preset field of the packet. To be specific, in this embodiment of the present disclosure, a method in which after the packet is processed, the packet includes the identification information is specifically provided, so as to enhance feasibility of the solution.

A second aspect of the embodiments of the present disclosure provides a network device. The network device has a function of implementing behavior of a first network device in the foregoing method designs. The function may be implemented by using hardware, or may be implemented by hardware by executing corresponding software. The hardware or the software includes one or more modules corresponding to the function. The module may be software and/or hardware.

In a possible implementation, the network device includes an obtaining module, a receiving module, a processing module, and a sending module.

The obtaining module is configured to obtain identification information. The receiving module is configured to receive a packet. The processing module is configured to process the packet when the receiving module receives the packet, where a processed packet includes the identification information obtained by the obtaining module, and packets corresponding to different preset policy information include different identification information. The sending module is configured to send the packet processed by the processing module to a second network device, so that the second network device matches a corresponding policy for the processed packet based on the identification information.

In a possible implementation, a structure of the network device includes a receiver, a processor, and a transmitter, where the receiver is configured to receive information data or an instruction related to the foregoing method, and the processor is configured to support the first network device in performing a corresponding function in the foregoing method. The transmitter sends the information or the instruction related to the foregoing method. The first network device may further include a memory, where the memory is configured to be coupled to the processor and store a program instruction and data that are required for the first network device.

A third aspect of the embodiments of the present disclosure provides a computer storage medium, the computer storage medium stores program code, and the program code is used to instruct to perform the method in the first aspect.

Compared with the prior art, it can be learned from the foregoing solutions that, in the embodiments of the present disclosure, after being processed by the first network device, the packets having different preset policy information have different identification information. Therefore, when performing policy matching, the second network device, namely, the downstream device of the first network device only needs to match the identification information and does not need to construct the key description information by extracting the plurality of the fields of the packet based on a packet type, to match the policy, so as to effectively resolve the problem that the quantity of concurrent packet processing policies is limited in the network device due to the scarcity of the hardware resource of the packet forwarding chip.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons skilled in the art may derive other drawings from these accompanying drawings.

DETAILED DESCRIPTION

Embodiments of the present disclosure provide a packet processing method and a network device, so as to effectively resolve a problem that a quantity of concurrent packet processing policies is limited in a network device due to scarce hardware resources of a packet forwarding chip.

To make persons skilled in the art understand the technical solutions in the present disclosure better, the following clearly describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by persons of ordinary skill in the art based on the embodiments of the present disclosure shall fall within the protection scope of the present disclosure.

In the specification, claims, and accompanying drawings of the present disclosure, the terms "first", "second", "third", "fourth", and the like (if any) are intended to distinguish between similar objects but do not necessarily indicate a specific order or sequence. It should be understood that the data termed in such a way is interchangeable in proper circumstances so that the embodiments of the present disclosure described herein can be implemented in other orders than the order illustrated or described herein. Moreover, the terms "include" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 1:
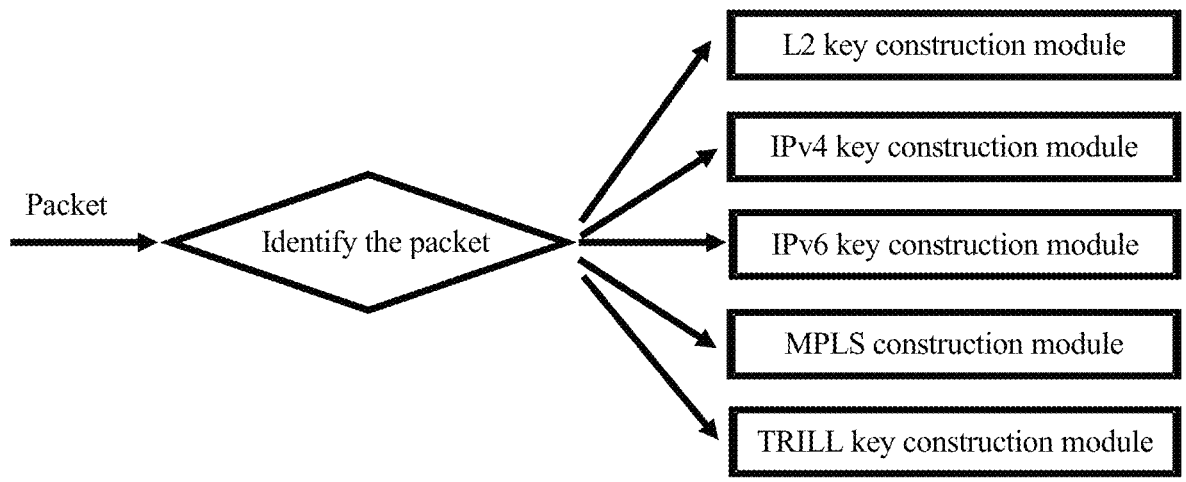
FIG. 1 is a schematic diagram of a process in which a network device performs policy matching on a packet in the prior art.
Figure 2:
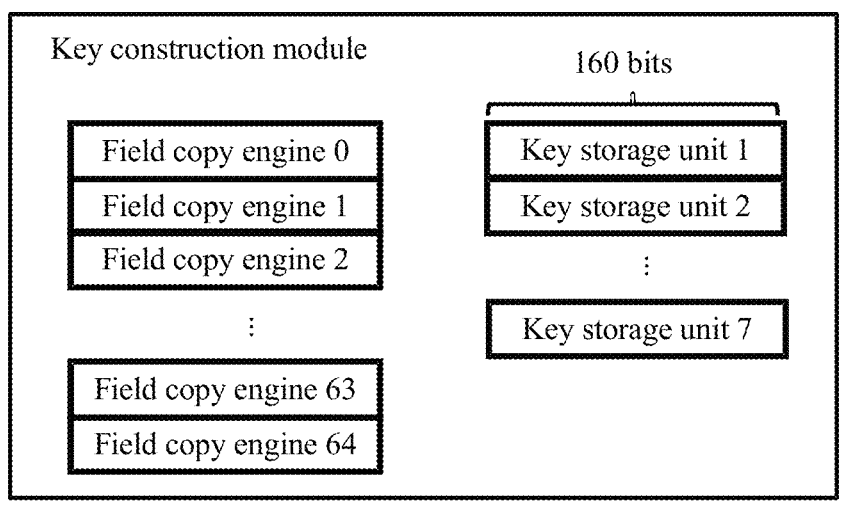
FIG. 2 is a schematic structural diagram of a construction module inside a packet forwarding chip in a network device.
Figure 3:
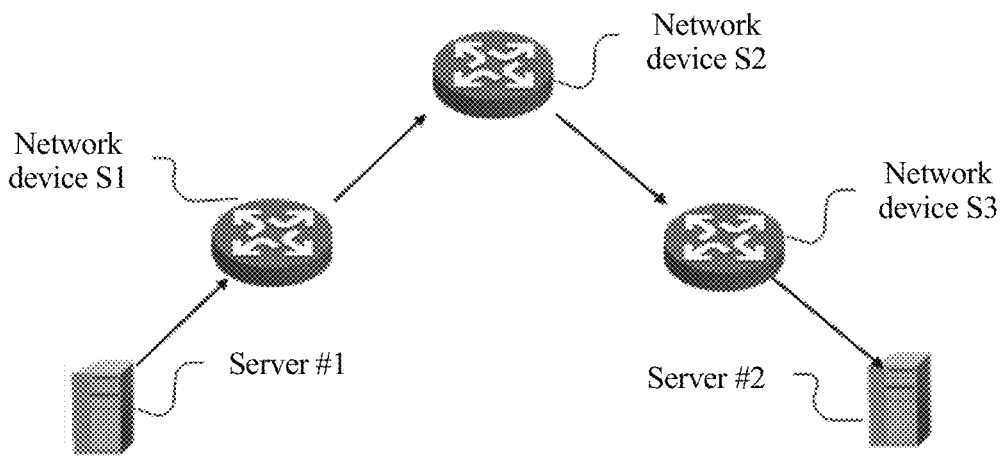
FIG. 3 is a schematic diagram of a system framework of a packet processing method according to an embodiment of the present disclosure.

Referring to FIG. 3, FIG. 3 is a schematic diagram of a system framework according to an embodiment of the present disclosure. The figure shown in FIG. 3 includes a plurality of network devices and servers. A network device is a physical entity device connected to a network. A wide variety of network devices may specifically be but are not limited to a computer (regardless of whether it is a personal computer or a server), a hub, a switch, a bridge, a router, a gateway, and the like. When a server #1 communicates with a server #2, for example, when the server #1 sends a packet to the server #2, the packet needs to be forwarded by a network device S1, a network device S2, and a network device S3 and finally reaches the server #2. It is assumed herein that the network device S1 is a first network device. In this embodiment of the present disclosure, the first network device obtains identification information. The first network device processes the packet when receiving the packet, and a processed packet includes the identification information. In the processed packet, the identification information that is included in packets corresponding to different preset policy information, namely, the packets corresponding to different ACL policy information, is different. The first network device sends the processed packet to a second network device based on a preset forwarding table, so that the second network device matches a corresponding policy for the processed packet based on the identification information. The first network device may be a network device in a particular network management domain. Specifically, in a network management domain corresponding to the system framework diagram shown in FIG. 3, the first network device may be the network device S1, the network device S2, and the network device S3 shown in FIG. 3, or may be the server #1 or the server #2. This is not specifically limited herein provided that in the packet in the network management domain, the packets having different preset policy information finally have different identification information. A second network device is a downstream network device of the first network device. For example, in the system architectural diagram shown in FIG. 3, the network device S2, the network device S3, and the server #2 are all downstream devices of the network device S1. For ease of understanding, the following describes in detail the embodiments of the present disclosure.

Figure 4:
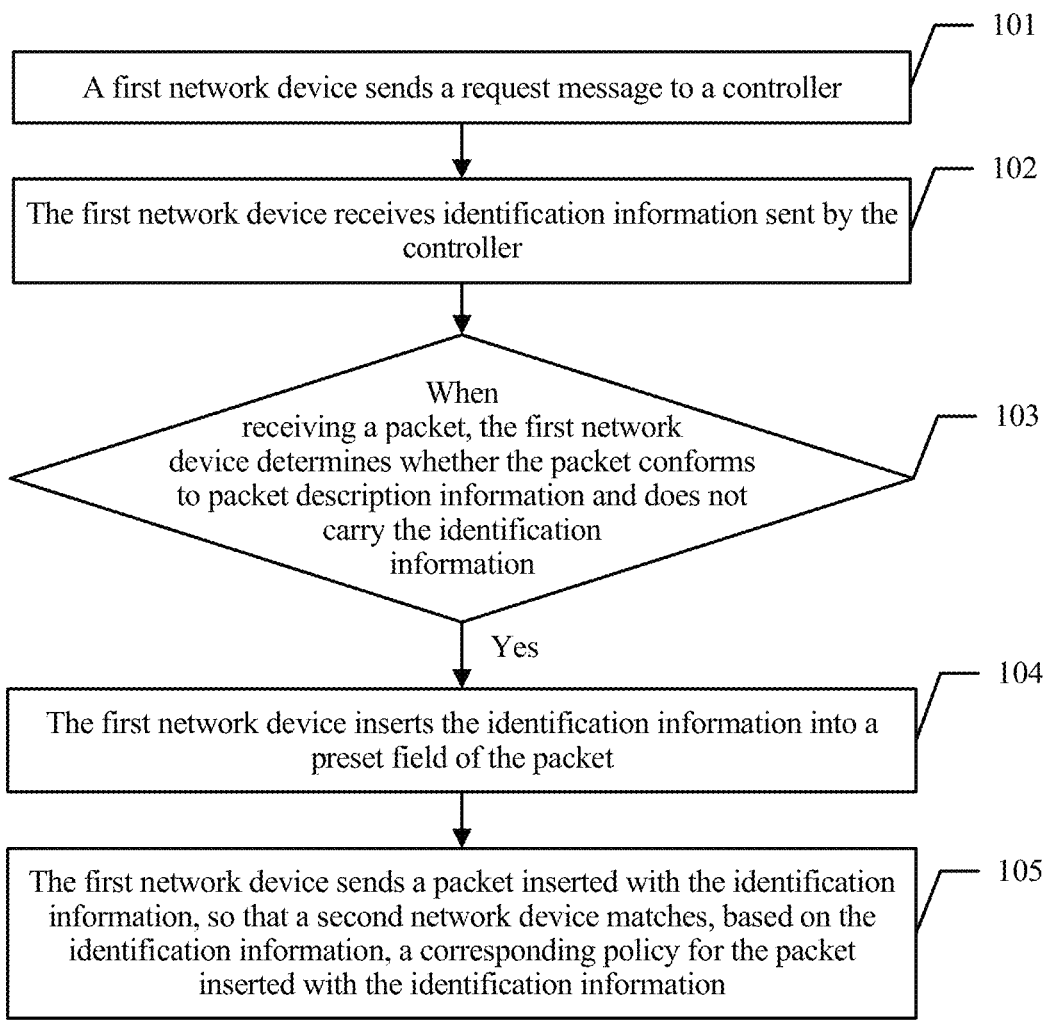
FIG. 4 is a schematic flowchart of an embodiment of a packet processing method according to an embodiment of the present disclosure.

Referring to FIG. 4, FIG. 4 is a schematic flowchart of an embodiment of a packet processing method according to an embodiment of the present disclosure. The method includes the following steps.

101. A first network device sends a request message to a controller.

The request message is used to request identification information from the controller.

102. The first network device receives identification information sent by the controller.

In this embodiment of the present disclosure, after sending the request message to the controller, the first network device receives the identification information sent by the controller. The identification information is determined by the controller based on packet description information in preset policy information after receiving the request message. The identification information is pre-configured information, and may be a number, a character string, or a random combination of the number and the character string, or another identifier. This is not specifically limited herein. The preset policy information is ACL policy information configured on the first network device. It should be understood that the ACL policy information includes packet flow description information and corresponding action information. The packet flow description information is description information used to classify the packet, and the description information may include but is not limited to information such as a source Medium Access Control (MAC) address, a destination MAC address, a source IP address, a destination IP address, an IP protocol type, a transport layer source port, and a transport layer destination port of the packet. The action information is action information corresponding to the packet that matches the preset policy information, for example, discarding or reception. Specific preset policy information is determined based on an actual policy configuration result. In addition, the identification information corresponds to the packet description information in the preset policy information, and different packet description information corresponds to different identification information.

For ease of understanding, the following uses a specific network topological diagram for description.

Figure 5:
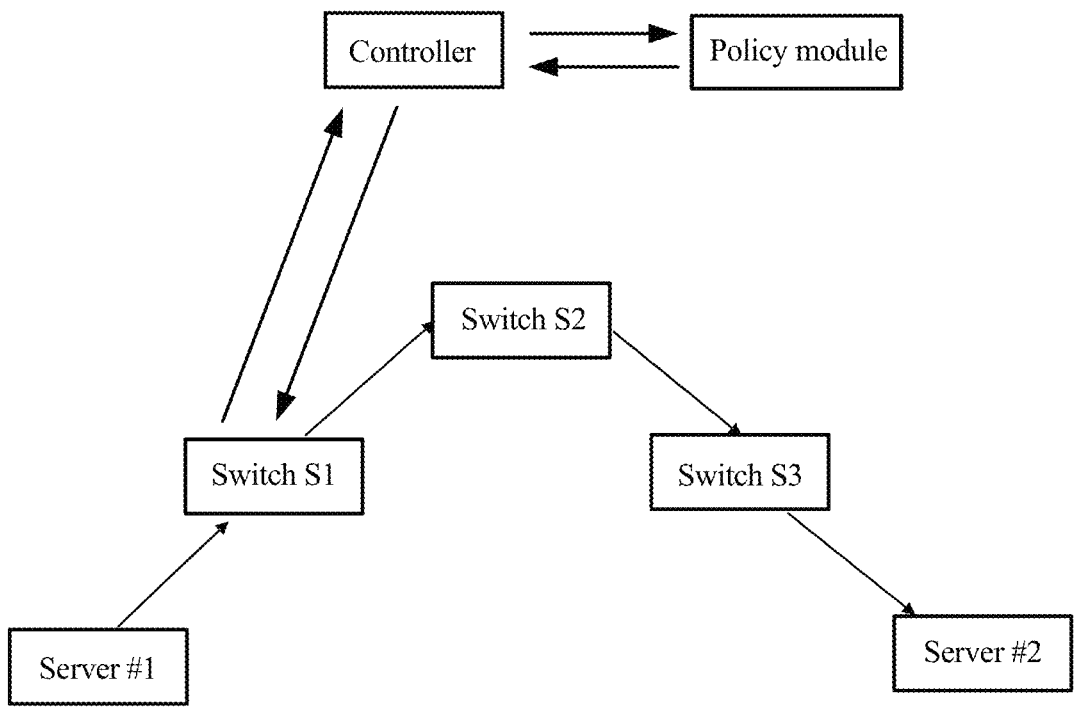
FIG. 5 is a schematic diagram of inserting identification information in a packet processing method according to an embodiment of the present disclosure.

As shown in FIG. 5, FIG. 5 is a schematic diagram of an application scenario of a packet processing method according to an embodiment of the present disclosure. An example in which the first network device is a switch S1 in FIG. 5 is used for description.

A policy module may include all preset policy information configured on the switch S1, namely, all ACL policy information. It should be understood that each ACL policy information includes the packet description information and the corresponding action information. For example, it is assumed that when the ACL policy information is performing a permit (allow to receive) action on the packet whose source IP address is 10.10.10.1 and whose destination IP address is 20.20.20.2, the source IP address and the destination IP address are the packet description information in the ACL policy information, and the permit action is the corresponding action information.

In an actual application, the policy module may be a module configured on the switch S1 or an independent hardware entity module, and this is not specifically limited herein. In this embodiment of the present disclosure, the switch S1 communicates with the controller, and the switch S1 sends a request message to the controller, where the request message is used to request the identification information from the controller. After the controller receives the foregoing request message, the controller communicates with the policy module, and determines the corresponding identification information based on the packet description information in the preset policy information in the policy module. The identification information corresponds to the packet description information in the preset policy information. To be specific, different packet description information corresponds to different identification information, and then the controller sends the determined identification information to the switch S1, to ensure that in a network in a network management domain, different identification information is allocated to the packets corresponding to different packet description information.

It should be noted that, in the foregoing method for obtaining the identification information, the switch S1 actively requests the identification information from the controller. In addition to the foregoing manner, the following manner may be further used.

The controller actively delivers the identification information, and FIG. 5 is still used as an example. Each time one piece of preset policy information is configured for the policy module, the controller allocates identification information for the packet description information in the preset policy information and delivers the identification information to the switch S1, to ensure that in the network in the network management domain, different identification information is allocated to the packets having different packet description information. To be specific, the identification information corresponds to the packet description information in the preset policy information, and different packet description information corresponds to different identification information.

It should be noted that the controller is a control center in the network management domain, and is a controller that can manage a network device in the network management domain.

103. When receiving a packet, the first network device determines whether the packet conforms to packet description information and does not carry the identification information. If the packet conforms to the packet description information and does not carry the identification information, step 104 is performed.

In this embodiment of the present disclosure, when receiving the packet, the first network device first determines whether the received packet already carries the identification information, and determines whether the packet conforms to the packet description information. If it is determined that the packet conforms to the packet description information and does not carry the identification information, step 104 is performed.

It should be noted that when it is determined that the received packet does not conform to the packet description information, it indicates that the policy module does not have the preset policy information for the packet. In this case, the first network device may choose to forward the packet based on a preset forwarding table.

104. The first network device inserts the identification information into a preset field of the packet.

In this embodiment of the present disclosure, when determining that the received packet does not carry the identification information and determining that the packet conforms to the packet description information, the first network device inserts the identification information into the preset field of the packet.

For example, it is assumed that the controller allocates identification information "31000" to the packet whose source IP address is 10.10.10.1 and whose destination IP address is 20.20.20.2. When the first network device receives the packet whose source IP address is 10.10.10.1 and whose destination IP address is 20.20.20.2, and the packet does not carry the identification information "31000", the first network device inserts the identification information "31000" into the preset field of the packet.

It should be noted that the preset field may be a field in this packet protocol specification, or may be a newly added field, and this is not specifically limited herein.

Figure 6:
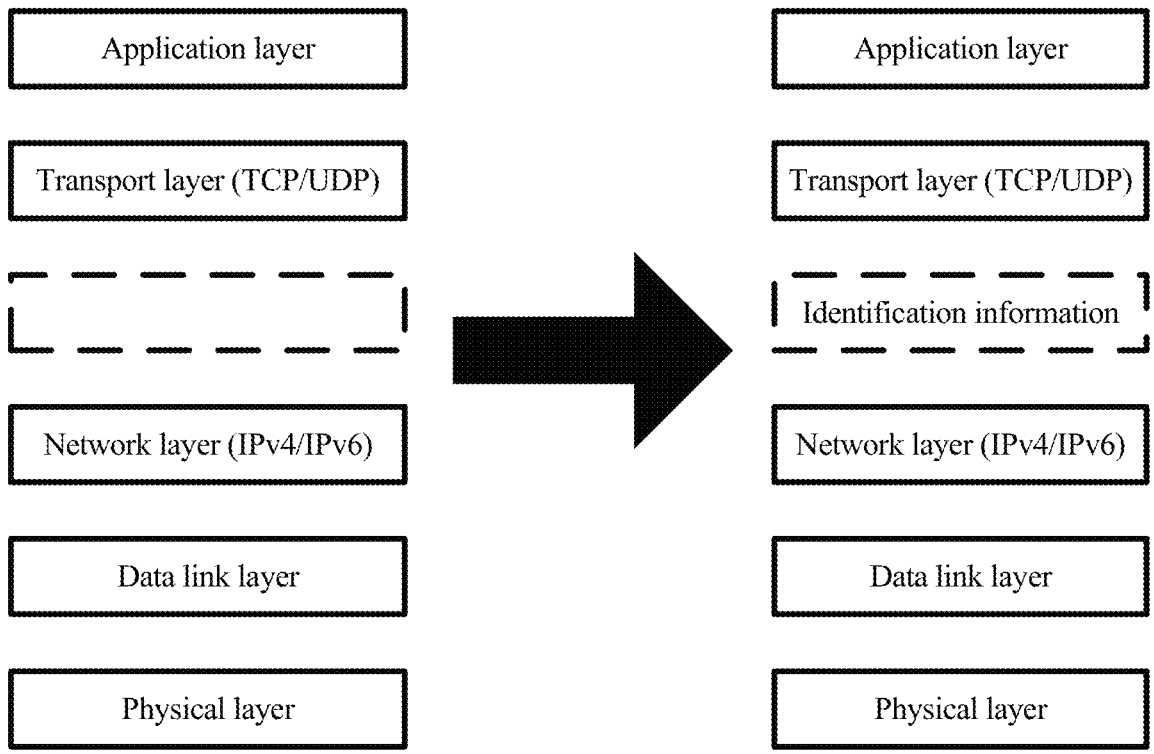
FIG. 6 is a schematic diagram of an application scenario of a packet processing method according to an embodiment of the present disclosure.

The first network device inserts the identification information between a network layer (an IP header) and a transport layer (Transmission Control Protocol/User Datagram Protocol (TCP/UDP)) header of the packet. As shown in FIG. 6, a left part is a hierarchy of the packet that is not inserted with the identification information and that is received by the first network device, and a right part is a hierarchy of a new packet obtained after the identification information is inserted into the packet received by the first network device.

For ease of understanding, the following uses a specific example of the packet for description.

Figure 7:
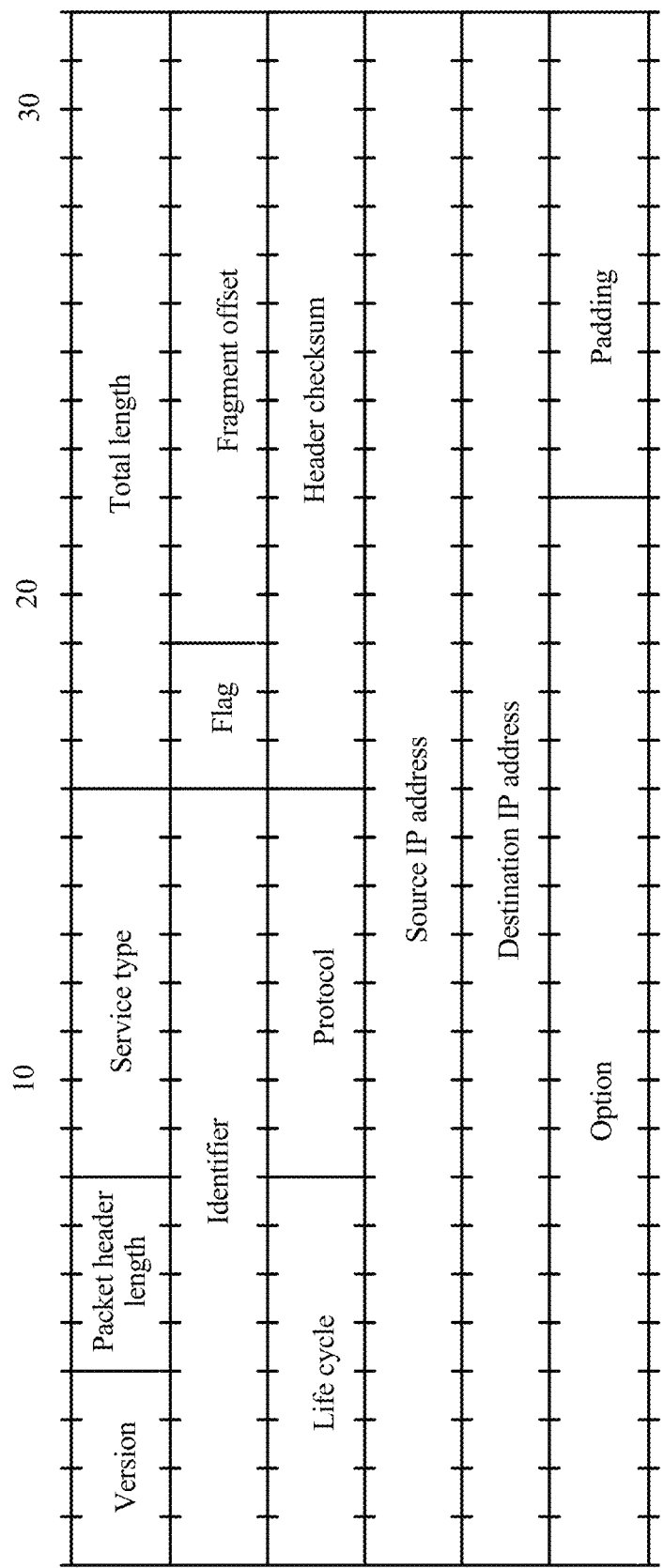
FIG. 7 is a schematic diagram of a format of an IPv4 packet header.

Referring to FIG. 7, it should be understood that a format of an IPv4 packet header is shown in FIG. 7. For the IPv4 packet header, the Internet Protocol specification RFC (Request For Comments) 791 defines a location, a length, and a meaning of each field in the IPv4 packet header. For example, a protocol field is 8 bits, and a location at which the IPv4 packet header is shifted backward by 71 bits is used as a starting point. To be specific, 8 consecutive bits starting from a seventy-second bit are the protocol field of the IPv4 packet header. The meaning is to indicate a protocol type corresponding to load of an IPv4 packet. To be specific, the specification RFC 790 specifies a correspondence between a value and a meaning of the protocol field in the IPv4 packet header. For example, the Internet Control Message Protocol (ICMP) corresponds to a value 1, the TCP protocol corresponds to a value 6, and the UDP protocol corresponds to a value 17. Specifically, the meaning of each field in the IPv4 packet header is not described herein.

Figure 8:
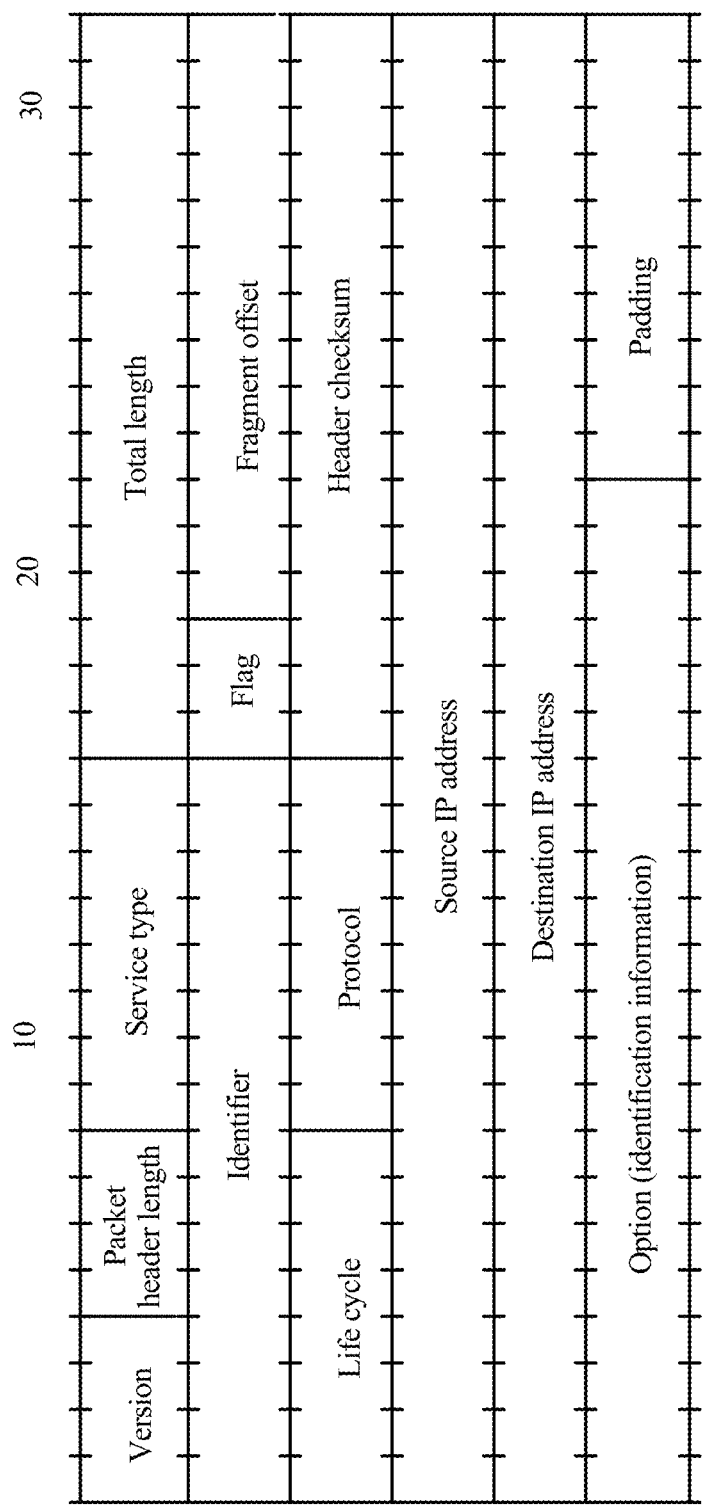
FIG. 8 is a schematic diagram of a format obtained after identification information is inserted into an IPv4 packet header according to an embodiment of the present disclosure.

In this embodiment of the present disclosure, optionally, the identification information may be inserted into an option field of the IPv4 packet header, specifically, as shown in FIG. 8. It should be noted that for a specific specification for the option field of the IPv4 packet header, refer to the RFC 791. The insertion and bearing of the identification information comply with a format specification of the RFC 791 for the option field of the IPv4 packet header. This is not specifically limited herein provided that the option field finally includes the identification information.

Figure 9:
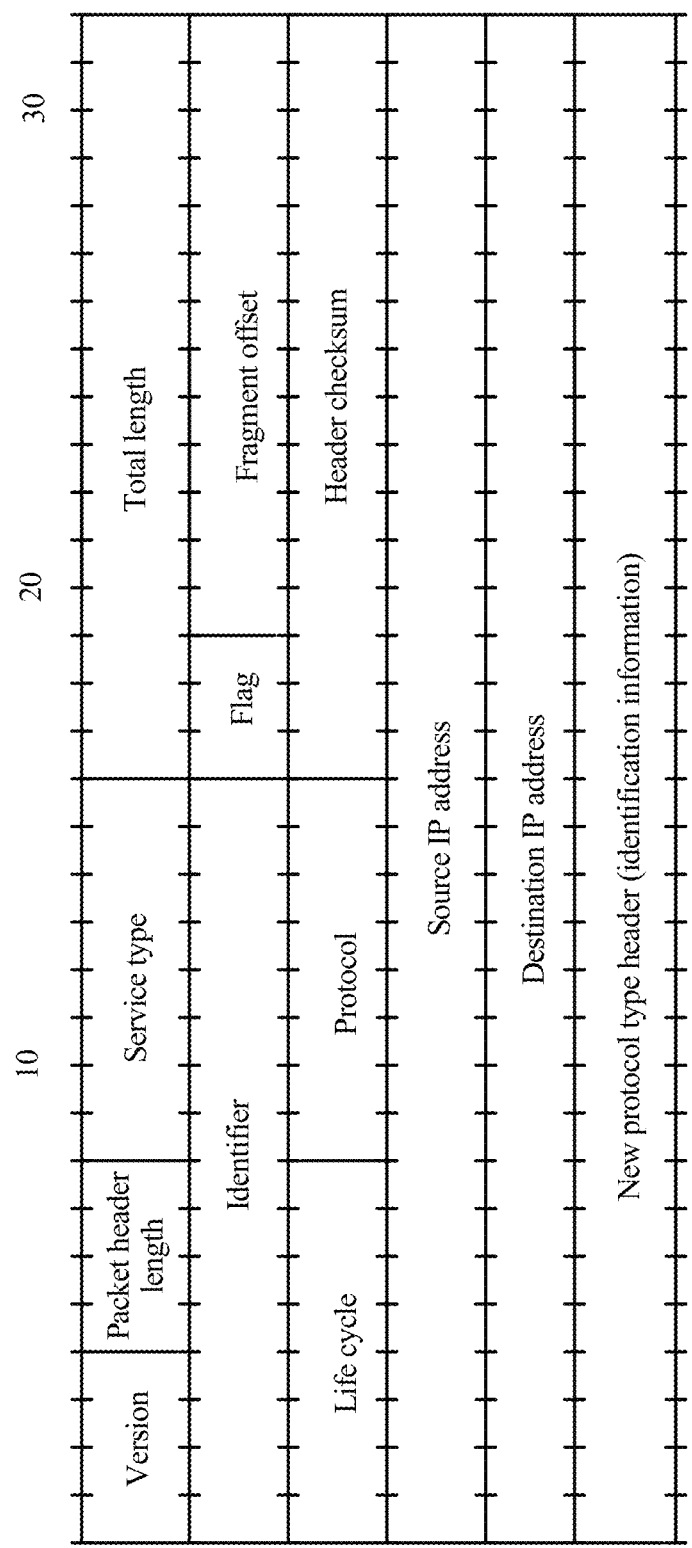
FIG. 9 is a schematic diagram of another format obtained after identification information is inserted into an IPv4 packet header according to an embodiment of the present disclosure.

Optionally, for the bearing of the identification information, a new IPv4 protocol type may be applied for, and then the identification information is carried in a new protocol type header. Specifically, as shown in FIG. 9, the identification information occupies 32 bits in the new protocol type header. However, it may be understood that a quantity of bits occupied by the identification information in the new protocol type header may be set based on an actual application situation. This is not specifically limited herein.

Figure 10:
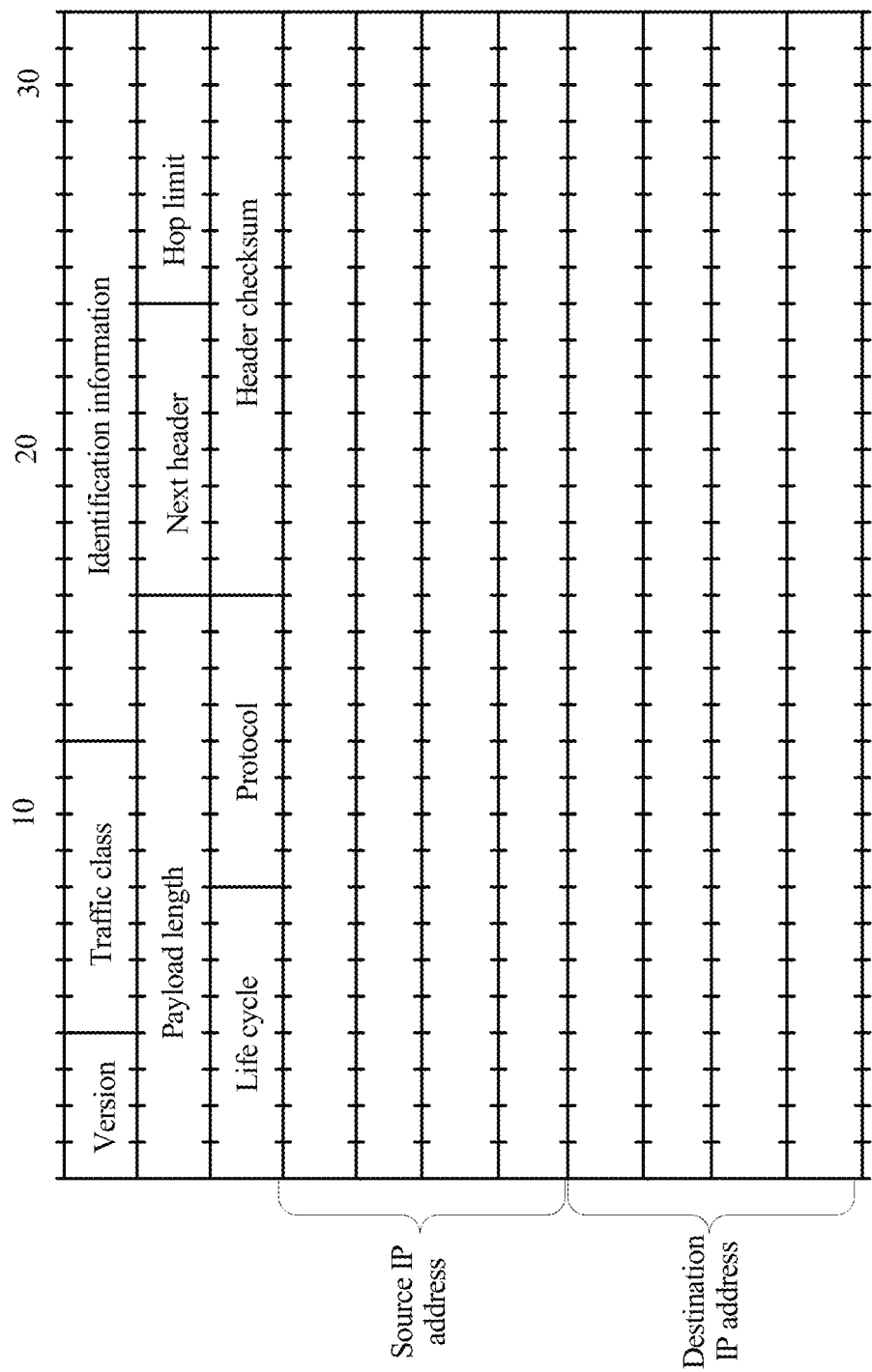
FIG. 10 is a schematic diagram of a format of an IPv6 packet header.

An IPv6 packet is used as an example. Referring to FIG. 10, a protocol format of an IPv6 packet header is specifically shown in FIG. 10. Similar to the IPv4 packet, in the IPv6 packet header, a location, a length, and a meaning of each field are specified by using the Internet Protocol. For example, a version indicates a version of the IP protocol, and a value corresponding to an IPv6 version is 0110. Specifically, the meaning of each field in the IPv6 packet is also not described herein.

Figure 11:
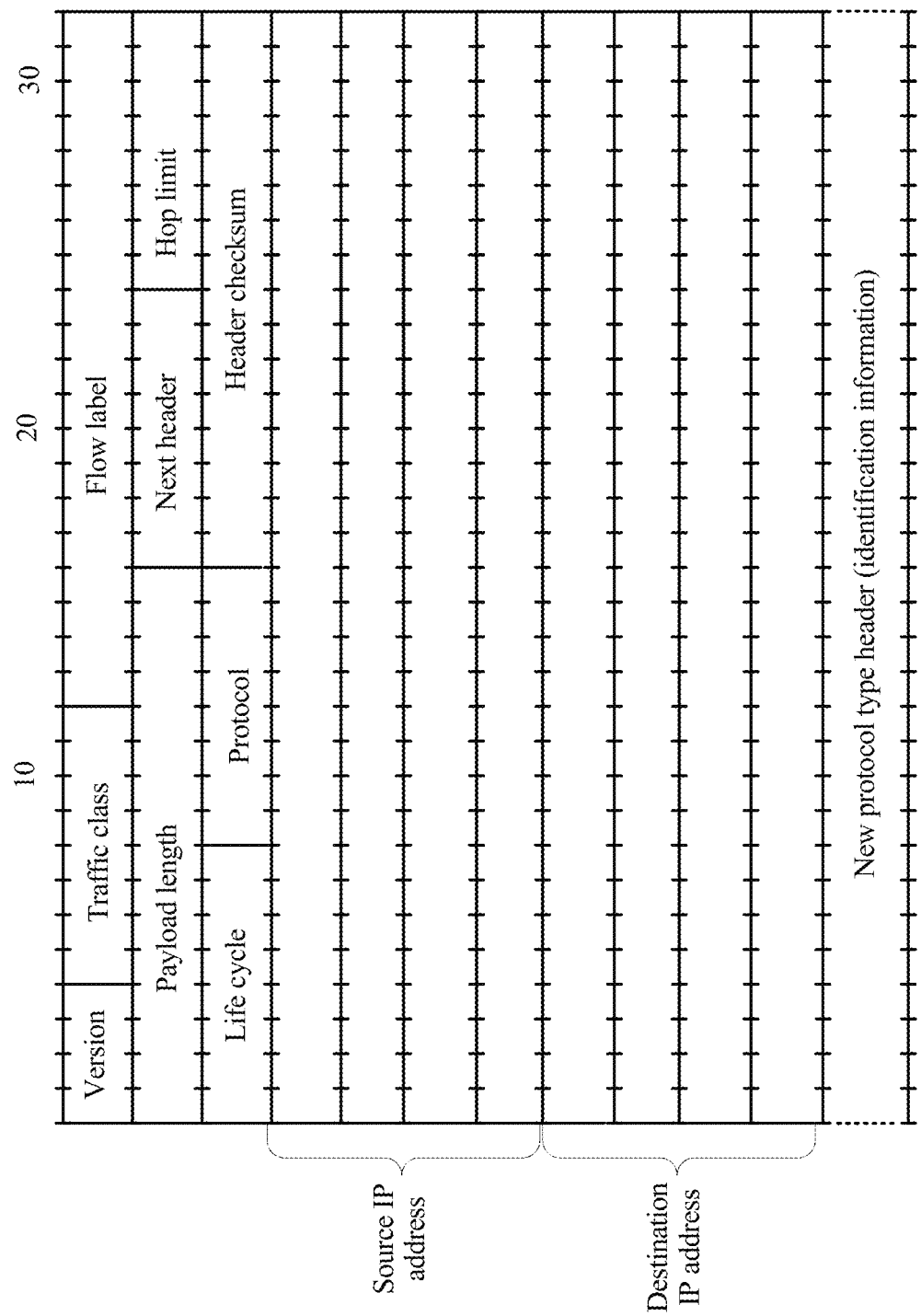
FIG. 11 is a schematic diagram of a format obtained after identification information is inserted into an IPv6 packet header according to an embodiment of the present disclosure.

Optionally, in this embodiment of the present disclosure, the bearing of the identification information may be implemented in a manner in which a new IPv6 protocol type is applied for, and then the identification information is carried in a new protocol type header. Specifically, as shown in FIG. 11, it should be noted that a quantity of bits occupied by the identification information in the new protocol type header may be set based on an actual application situation, and this is not specifically limited herein.

Figure 12:
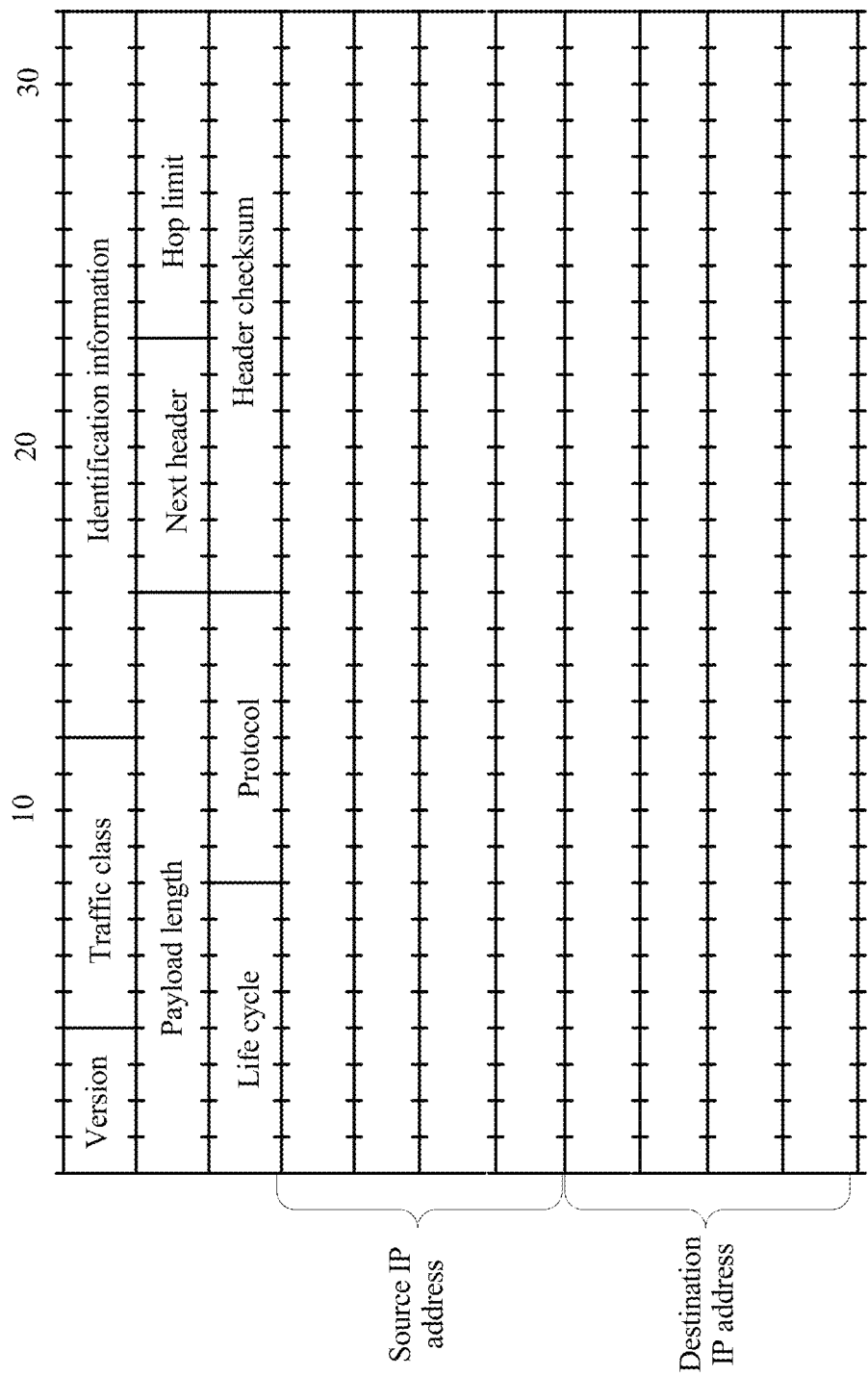
FIG. 12 is a schematic diagram of another format obtained after identification information is inserted into an IPv6 packet header according to an embodiment of the present disclosure.

Optionally, in this embodiment of the present disclosure, a flow label in the IPv6 packet header may be further rewritten as the identification information, specifically, as shown in FIG. 12.

Figure 13:
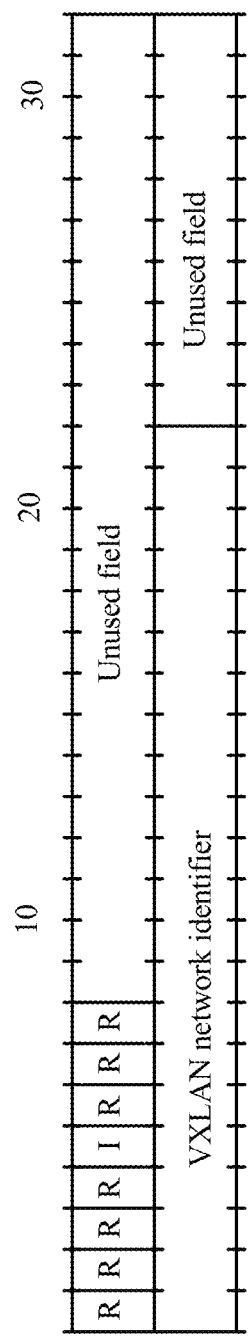
FIG. 13 is a schematic diagram of a format of a WXLAN packet header.
Figure 14:
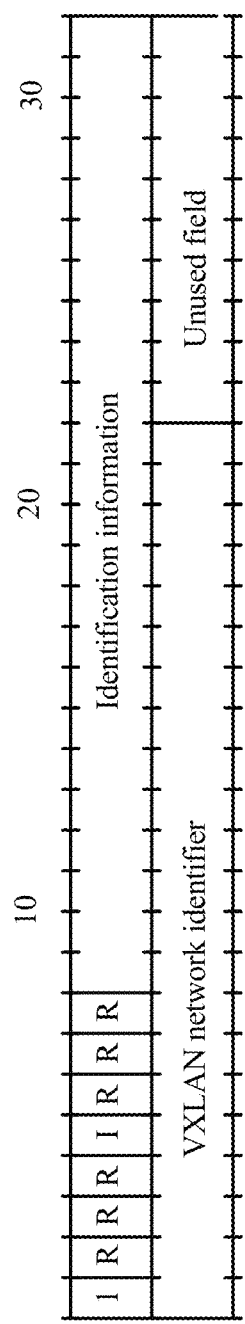
FIG. 14 is a schematic diagram of a format obtained after identification information is inserted into a WXLAN packet header according to an embodiment of the present disclosure.

In addition, the identification information may also be placed in an IP tunnel header, for example, in a virtual extensible local area network (VXLAN) packet header. As shown in FIG. 13, FIG. 13 is a schematic diagram of a format of the VXLAN packet header, and an identifier bit (I), an unused bit (F), a reserved field, and a VXLAN network identifier (VXLAN Network ID) are included. It should be understood that the identifier bit (I) is used to indicate that the VXLAN network identifier is valid. In this embodiment of the present disclosure, the identification information may be carried in the reserved field of the VXLAN packet header. Specifically, as shown in FIG. 14, herein, a first bit location of the VXLAN packet header is 1, indicating that ninth to thirty-second bits carry the identification information of the packet, or such an indication is provided by using a specific value of another agreed bit location. This is not specifically limited herein, and details are not described herein.

It should be noted that the foregoing process of inserting the identification information is merely used as an example for description herein, but does not constitute a limitation on this embodiment of the present disclosure. The identification information may be placed to another specified location of the packet by agreement in a protocol specification manner, or may be carried by inserting a specific field into another specific location in an agreed specification manner, and this is not specifically limited herein.

It should be further noted that, to facilitate processing performed by the first network device, the insertion location of the identification information and the length of the field are a fixed location and a fixed length relative to the packet header, or at least within a specific space range, to be specific, in a particular preset network device management domain, or fixed in a preset time range (time period), and this is not specifically limited herein.

105. The first network device sends a packet inserted with the identification information, so that a second network device matches, based on the identification information, a corresponding policy for the packet inserted with the identification information.

In this embodiment of the present disclosure, the first network device may send, based on the preset forwarding table, the packet inserted with the identification information, so that the second network device matches, based on the identification information, the corresponding policy for the packet inserted with the identification information.

Figure 15:
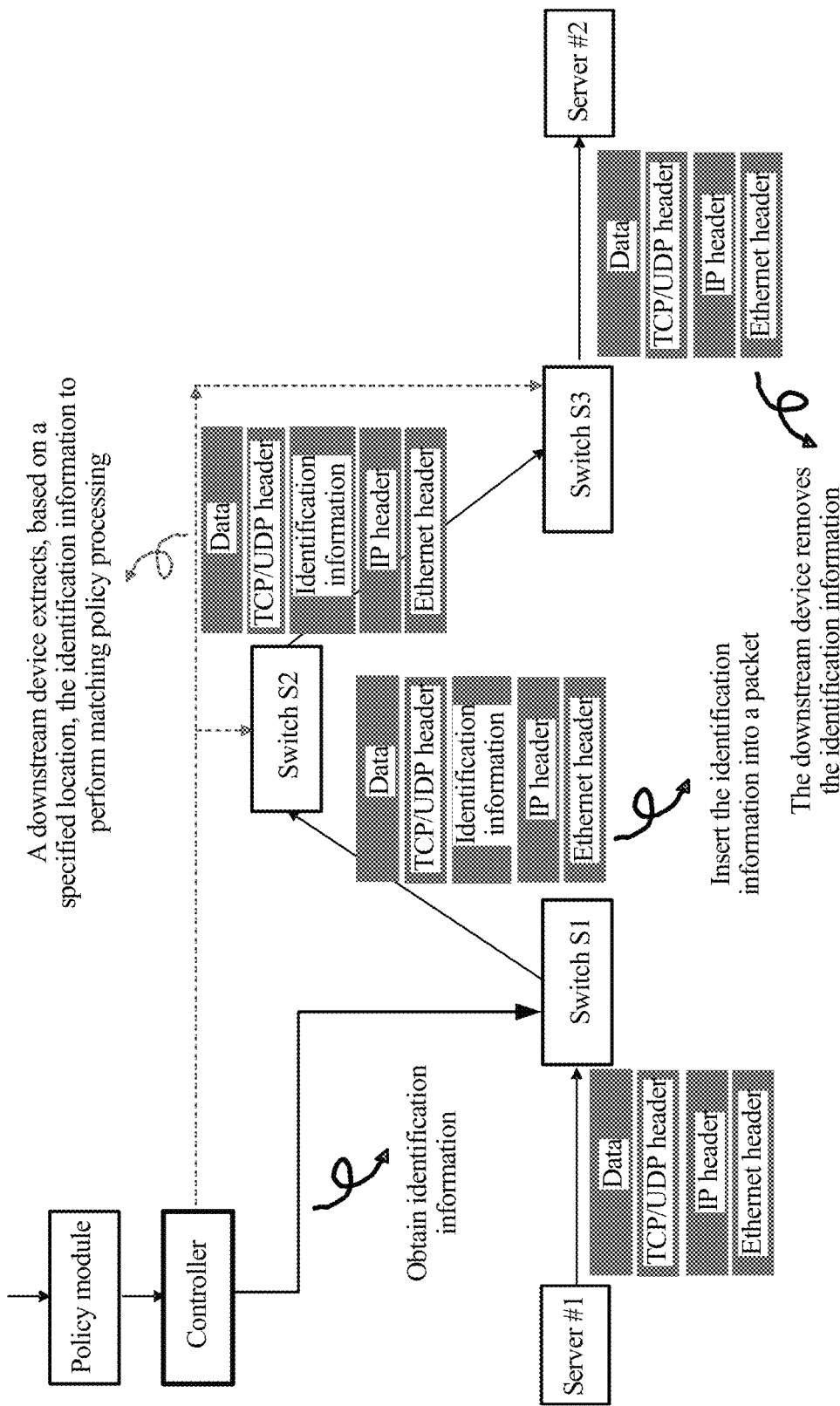
FIG. 15 is a schematic diagram of an application scenario of a packet processing method according to an embodiment of the present disclosure.

As shown in FIG. 15, FIG. 15 is a schematic diagram of an application scenario of a packet processing method according to an embodiment of the present disclosure. In FIG. 15, a switch S1 is used as a first network device. It may be understood that, in a procedure shown in FIG. 15, a downstream device of the switch S1, to be specific, a second network device may perform policy matching based on identification information when receiving a packet inserted with the identification information. Optionally, the downstream device may also erase, according to an actual configuration situation, the identification information inserted by the switch S1.

It should be noted herein that in the foregoing description, specifically, a key point is that a method for obtaining the identification information needs to be configured. The identification information may be directly or indirectly from a centralized controller, to ensure that in a network in a management domain, packets having different preset policy information do not have same identification information. In addition to two methods for obtaining the identification information described above, there is further another method for allocating the identification information. For example, the first network device allocates the identification information. Specifically, the first network device receives an identification information set sent by the controller, the first network device determines the identification information based on the identification information set, and the identification information is identification information in the identification information set. Then, the first network device allocates different identification information to the packets having different preset policy information, and the controller is notified of a correspondence between the identification information and different preset policy information, so that the controller performs policy matching on the downstream device of the first network device. To be specific, in this embodiment of the present disclosure, in addition to the two methods for obtaining the identification information described above, the controller may further allocate a segment of the identification information set to each switch, and an identification information set of each switch does not overlap each other. The switch S1 is used as an example, and the switch S1 may autonomously determine the identification information for the packet in the identification information set authorized by the switch S1. When receiving the packet, the switch S1 inserts the identification information into a preset field of the packet provided that the identification information corresponds to packet description information in the preset policy information, to be specific, different packet description information corresponds to different identification information.

In conclusion, in this embodiment of the present disclosure, there are a plurality of methods for allocating the identification information. For each packet flow, to be specific, globally unique identification information in a network management domain is allocated to a packet having each type of packet description information. In this way, the packets having different preset policy information certainly do not have the same identification information. Another case is that for packets corresponding to same action information, same identification information may be allocated to packets having different packet description information, provided that packets corresponding to different action information have different identification information. This is not specifically limited herein.

Figure 16:
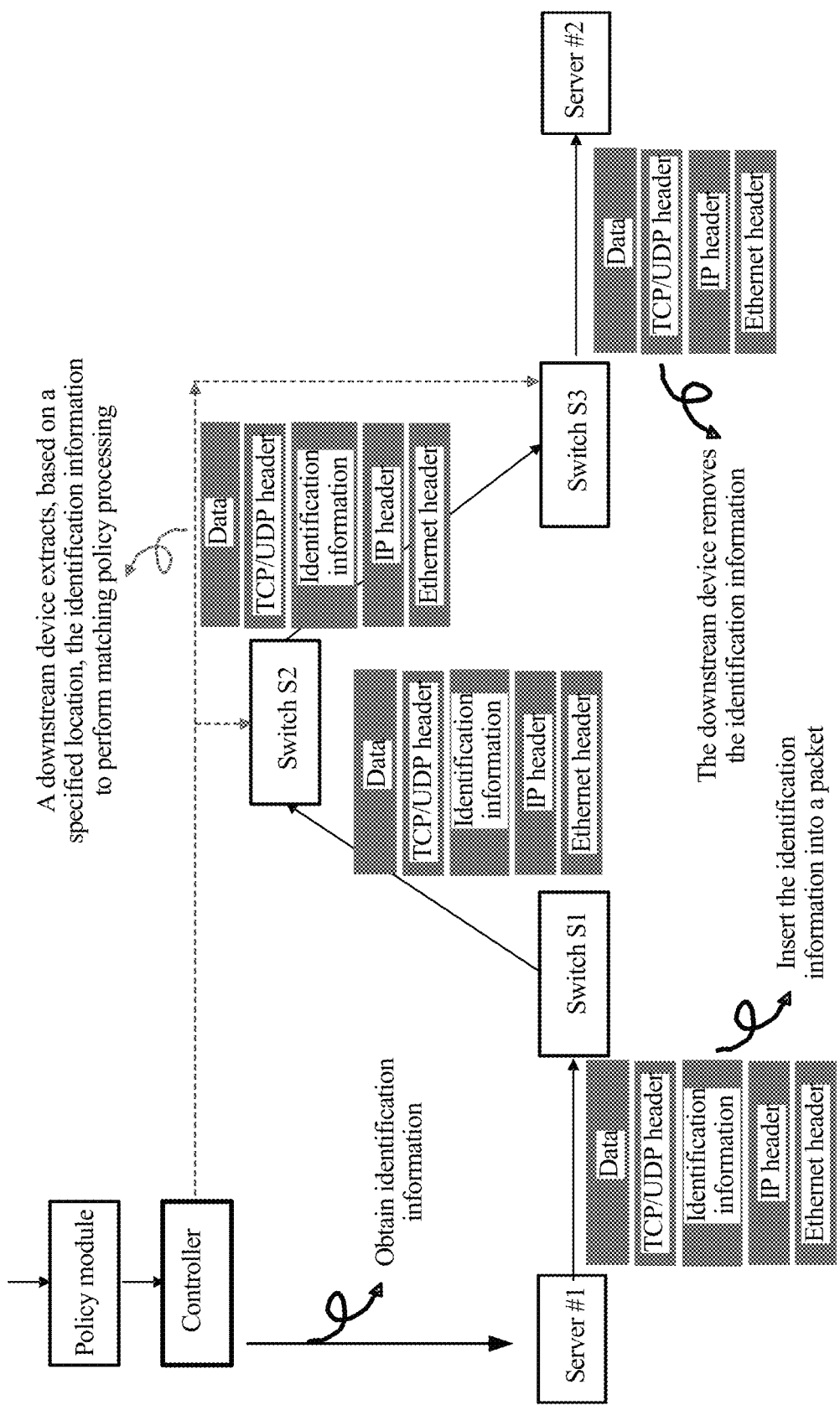
FIG. 16 is a schematic diagram of another application scenario of a packet processing method according to an embodiment of the present disclosure.

It should be noted that in the above-enumerated examples, the switch S1 is used as an example. However, in an actual application, a server #1 or a server #2 may also be used as the first network device in this embodiment of the present disclosure. As shown in FIG. 16, an edge device in the network management domain, namely, the server #1 is selected as the first network device. Specifically, this embodiment of the present disclosure may be implemented by, for example, additionally installing a program on the server #1 or modifying host protocol stack code or adding a function to a virtual switch (vSwitch), and this is not specifically limited herein.

In this embodiment of the present disclosure, after inserting the identification information into the preset field of the received packet, the first network device may forward, based on a preset forwarding table, the packet inserted with the identification information. It should be understood that after the step of inserting the identification information in this embodiment of the present disclosure, the packets having different preset policy information have different identification information. Therefore, it is very easy for the downstream network device of the first network device, namely, the second network device to perform policy processing. The second network device only needs to read the identification information from a specified location of the packet for matching. If the identification information matches the preset policy information, a corresponding policy is executed, or if the identification information does not match the preset policy information, policy processing is ignored.

Figures 17, 18:
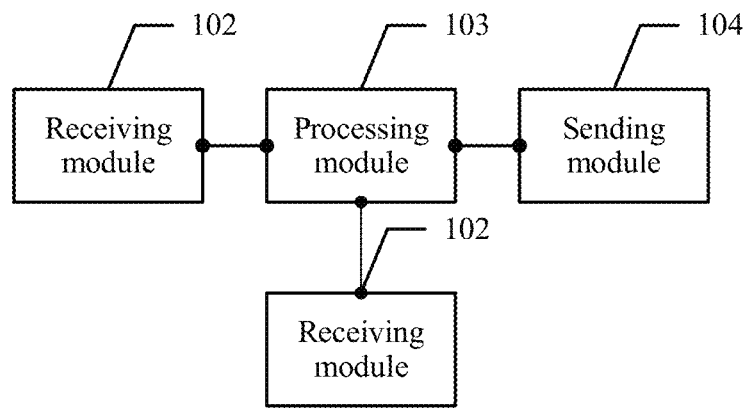
FIG. 17 is a schematic diagram of a policy configuration manner in a packet processing method according to an embodiment of the present disclosure.
FIG. 18 is a schematic structural diagram of an embodiment of a network device according to an embodiment of the present disclosure.

For example, after this embodiment of the present disclosure is used, if the corresponding identification information is an identifier with a value of 31000, configuration on a subsequent network device may be normalized to a policy shown in FIG. 17. It should be understood that for "ip access-list extended apply_racl", a keyword "ip" indicates that the policy is for an IP packet, a keyword "access-list" indicates that the policy is an access control list policy configuration, a keyword "extended" indicates that the policy is an extended access control list, a word "apply_racl" indicates a name that a user names the extended access list, namely, the policy, and "permit flow id 31000" indicates that the "apply_racl" policy permits the packet including the identification information 31000 to access. In addition, "interface GigabitEthernet3/1" specifies that the following configuration is applied to a port whose name is "GigabitEthernet3/1" on a network device, and "ip address 192.168.1.1 255.255.255.0" is used to specify an IP address of the port, and is used to configure an IP address for the port.

In addition, "ip access-group apply_racl out" is used to specify that the policy applied to the port is "apply_racl", where "apply_racl" indicates that the policy applied herein is the access policy "apply_racl" configured on this system. It can be seen that during matching, only one field of the identification information 31000 of the packet needs to be matched, and there is no need to extract a plurality of fields of the packet to obtain key description information through combination for matching, so as to entirely resolve a problem that a quantity of concurrent packet processing policies is limited due to a design problem of a forwarding chip in an existing network device.

To be specific, it can be learned from the foregoing solutions that, after being processed by the first network device, the packets having different policy information have different identification information. Therefore, when performing the policy matching, the second network device, namely, the downstream device of the first network device only needs to match the identification information and does not need to construct the key description information by using the packet field, to match the policy, so as to effectively resolve a problem that the quantity of concurrent packet processing policies is limited in the network device due to scarce hardware resources of the packet forwarding chip.

The foregoing describes a packet processing method in an embodiment of the present disclosure, and the following describes a network device in an embodiment of the present disclosure.

Referring to FIG. 18, FIG. 18 is a schematic structural diagram of an embodiment of a network device according to an embodiment of the present disclosure. The network device includes an obtaining module 101, a receiving module 102, a processing module 103, and a sending module 104.

The obtaining module 101 is configured to obtain identification information. The receiving module 102 is configured to receive a packet. The processing module 103 is configured to process the packet when the receiving module 102 receives the packet, where a processed packet includes the identification information obtained by the obtaining module 101, and packets corresponding to different preset policy information include different identification information. The sending module 104 is configured to send the packet processed by the processing module 103 to a second network device, so that the second network device matches a corresponding policy for the processed packet based on the identification information.

In a possible implementation, the obtaining module 101 includes a sending unit and a receiving unit. The sending unit is configured to send a request message to a controller. The receiving unit is configured to receive the identification information sent by the controller, where the identification information is determined by the controller based on packet description information in the preset policy information after receiving the request message sent by the sending unit, the identification information corresponds to the packet description information in the preset policy information, and different packet description information corresponds to different identification information.

The processing module 103 is specifically configured to: when the receiving module 102 receives the packet, process the packet if the packet conforms to the packet description information.

In a possible implementation, the obtaining module 101 includes a receiving unit, and the receiving unit is configured to receive the identification information sent by a controller, where the identification information is determined by the controller based on packet description information in the preset policy information, the identification information corresponds to the packet description information in the preset policy information, and different packet description information corresponds to different identification information.

The processing module 103 is specifically configured to: when the receiving module 102 receives the packet, process the packet if the packet conforms to the packet description information.

In a possible implementation, the receiving unit is configured to receive an identification information set sent by a controller. The obtaining unit is configured to obtain the identification information from the identification information set, where the identification information is identification information in the identification information set.

In a possible implementation, the processing module 103 is specifically configured to process the packet based on the identification information if the processing module 103 determines that the packet conforms to the packet description information and the packet does not carry the identification information.

In a possible implementation, if the processing module 103 determines that the packet conforms to the packet description information and the packet does not carry the identification information, the processing module 103 is specifically configured to insert the identification information into a preset field of the packet.

It can be learned from the foregoing solutions that, after being processed by a first network device, the packets having different policy information have different identification information. Therefore, when performing policy matching, the second network device, namely, a downstream device of the first network device only needs to match the identification information and does not need to construct key description information by using a plurality of fields of the packet, to match a policy, so as to effectively resolve a problem that a quantity of concurrent packet processing policies is limited in the network device due to scarce hardware resources of a packet forwarding chip.

It should be noted herein that, with reference to the foregoing embodiment, for functions or performed steps or more details of the obtaining module 101, the receiving module 102, the processing module 103, and the sending module 104, refer to a process corresponding to the first network device in the foregoing method embodiment. Details are not specifically described herein again.

The foregoing describes the network device in this embodiment of the present disclosure from a perspective of a modular functional entity, and the following describes the network device in this embodiment of the present disclosure from a perspective of hardware processing.

Figure 19:
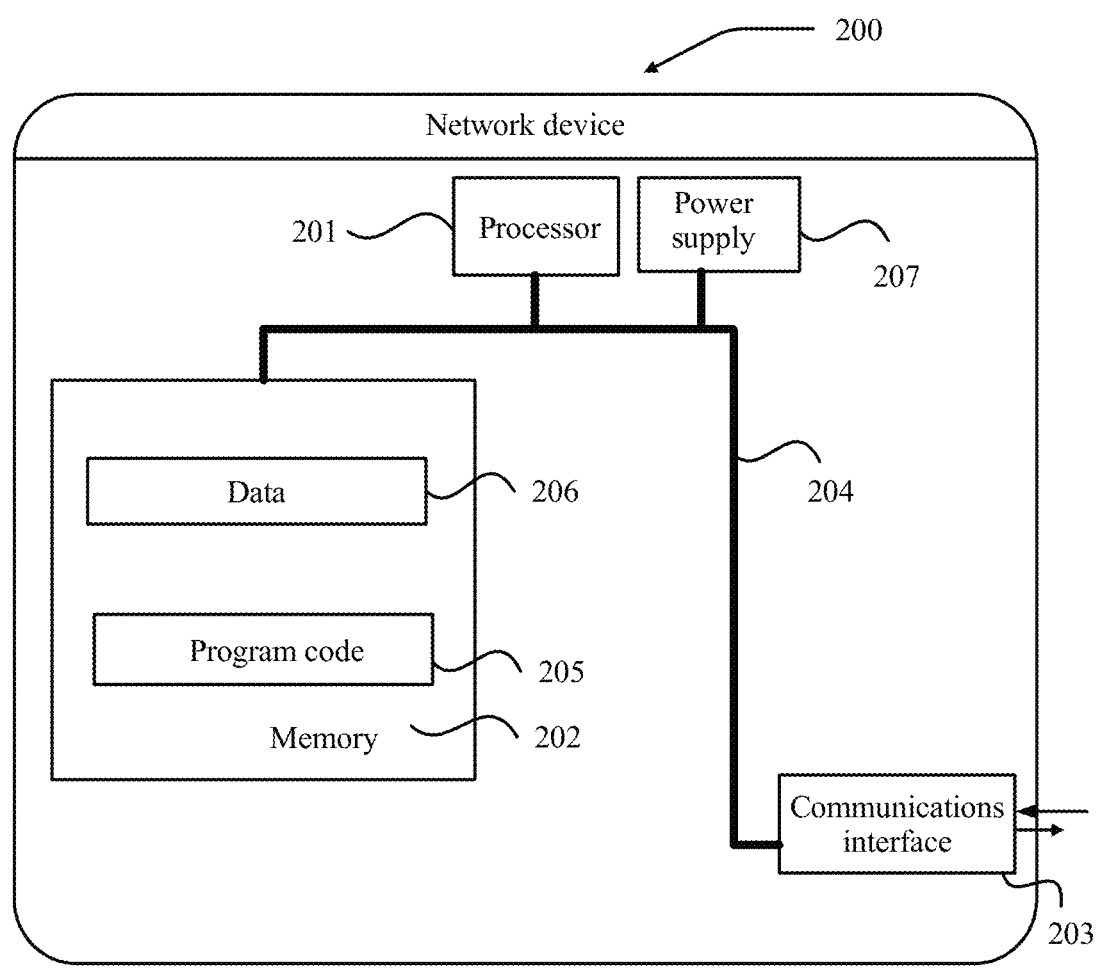
FIG. 19 is a schematic structural diagram of another embodiment of a network device according to an embodiment of the present disclosure.

FIG. 19 is a schematic structural diagram of a network device according to an embodiment of this application. The network device 200 includes a processor 201, a memory 202, and a communications interface 203. The processor 201, the memory 202, and the communications interface 203 are connected to each other by using a bus 204.

The processor 201 may be a central processing unit (CPU), a network processor (NP), or a combination of the CPU and the NP. The processor may further include a hardware chip, which may be specifically an application-specific integrated circuit (ASIC), a programmable logic device (PLD), or a combination thereof. In addition, the PLD may be a complex programmable logical device (CPLD), a field-programmable gate array (FPGA), generic array logic (GAL), or any combination thereof. This is not limited in this application.

The memory 202 may include a volatile memory, for example, a random-access memory (RAM); or the memory may include a non-volatile memory, for example, a flash memory, a hard disk drive (HDD), or a solid-state drive (SSD); or the memory may include a combination of the foregoing types of memories.

The bus 204 may be a peripheral component interconnect (PCI) bus, an extended industry standard architecture (EISA) bus, or the like. The bus may be further classified into an address bus, a data bus, a control bus, and the like. For ease of representation, only one thick line is used in FIG. 19 for representation, but it does not indicate that there is only one bus or one type of bus.

The communications interface 203 is configured to send or receive an instruction or data used by a corresponding network device in the foregoing corresponding method embodiment.

The memory 202 may store program code 205, and may further store data 206 used by the network device in the foregoing method embodiment. For example, the data 206 may be information data related to a first network device in the foregoing method embodiment, such as identification information, an identification information set, and preset policy configuration information. The processor 201 may invoke the program code 205 stored in the memory, to perform corresponding steps in the foregoing method embodiment, so that the network device may finally implement a function of the first network device in the foregoing method embodiment.

The network device 200 may further include a power supply 207. It should be noted that a structure of the network device shown in FIG. 17 does not constitute a limitation on the network device. The network device may include components more or fewer than those shown in the figure, or combine some components or different component arrangements. Details are not specifically described herein.

Steps performed by the network device in this embodiment of this application may be based on a schematic structural diagram of the network device shown in FIG. 17. For details, refer to a process corresponding to the first network device in the foregoing method embodiment, and details are also not described herein again.

In the several embodiments provided in this application, it should be understood that the disclosed system, module, and method may be implemented in other manners. For example, the described apparatus embodiment is merely an example. For example, the module division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional modules in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated module is implemented in the form of a software functional unit and sold or used as an independent product, the integrated module may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method comprising:
    receiving, by a second network device, a packet, the packet comprising identification information, wherein packets corresponding to different preset policy information of the second network device comprise different identification information;
    matching, by the second network device, a corresponding policy for the packet based on the identification information by determining specific preset policy information based on an actual policy configuration result;
    making, by the second network device, an action based on the corresponding policy matched for the processed packet.

2. The method according to claim 1, wherein packets corresponding to different action information of preset policy information of the second network device comprise different identification information.

3. The method according to claim 1, wherein the packets corresponding to different preset policy information include different identification information in one network management domain.

4. The method according to claim 1, wherein the preset policy information of the second network device is access control list policy information.

5. The method according to claim 4, wherein the access control list policy information comprises identification information and corresponding action information.

6. A method comprising:
- obtaining, by a first network device, identification information;
- receiving, by the first network device, a packet;
- processing, by the first network device, the received packet to generate a processed packet comprising the identification information, wherein processed packets corresponding to different preset policy information of a second network device comprise different identification information;
- sending, by the first network device, the processed packet to the second network device for matching a corresponding policy for the processed packet based on the identification information by determining specific preset policy information based on an actual policy configuration result; and
- making an action based on the corresponding policy matched for the processed packet.

7. The method according to claim 6, wherein processed packets corresponding to different action information of preset policy information of the second network device comprise different identification information.

8. The method according to claim 6, wherein the packets corresponding to different preset policy information include different identification information in one network management domain.

9. The method according to claim 6, wherein the preset policy information of a second network device is access control list policy information.

10. The method according to claim 9, wherein the access control list policy information comprises identification information and corresponding action information.

11. The method according to claim 6, wherein processing the received packet based on the identification information comprises:
- inserting, by the first network device, the identification information into a preset field of the received packet.

12. A second network device, comprising:
- a receiver configured to receive a packet, the packet comprising identification information, wherein packets corresponding to different preset policy information of the second network device comprise different identification information; and
- a processor configured to match a corresponding policy for the packet based on the identification information by determining specific preset policy information based on an actual policy configuration result and make an action based on the corresponding policy matched for the processed packet.

13. The second network device according to claim 12, wherein packets corresponding to different action information of preset policy information of the second network device comprise different identification information.

14. The second network device according to claim 12, wherein the packets corresponding to different preset policy information include different identification information in one network management domain.

15. The second network device according to claim 12, wherein the preset policy information of the second network device is access control list policy information.

16. The second network device according to claim 15, wherein the access control list policy information comprises identification information and corresponding action information.

17. A first network device, comprising:
- a receiver configured to receive a packet;
- a processor configured to process the received packet to generate a processed packet comprising identification information, wherein processed packets corresponding to different preset policy information of a second network device comprise different identification information; and
- a transmitter configured to send the processed packet processed to the second network device for matching a corresponding policy for the processed packet based on the identification information by determining specific preset policy information based on an actual policy configuration result and making an action based on the corresponding policy matched for the processed packet.

18. The first network device according to claim 17, wherein processed packets corresponding to different action information of preset policy information of the second network device comprise different identification information.

19. The first network device according to claim 17, wherein the packets corresponding to different preset policy information include different identification information in one network management domain.

20. The first network device according to claim 17, wherein the preset policy information of a second network device is access control list policy information.

* * * * *